United States Patent Office 3,497,547
Patented Feb. 24, 1970

3,497,547
CONTINUOUS PRODUCTION OF TETRACHLORO-O-PHTHALONITRILE BY CHLORINATION OF O-PHTHALONITRILE WITH Pt OR Pd CATALYST
Horst Scheuermann, Matthias Seefelder, and Heinz Eilingsfeld, Ludwigshafen (Rhine), Germany, assignors to Badische Anilin- & Soda-Fabrik Aktiengesellschaft, Ludwigshafen (Rhine), Rhineland-Palatinate, Germany
No Drawing. Filed Sept. 6, 1967, Ser. No. 665,721
Claims priority, application Germany, Sept. 10, 1966, 1,277,838
Int. Cl. C07c *121/56*
U.S. Cl. 260—465           9 Claims

ABSTRACT OF THE DISCLOSURE

Continuous production of tetrachloro-o-phthalonitrile by reaction of o-phthalonitrile and chlorine in the molar ratio of at least 1:4 in the gas phase at temperatures of 300° to 500° C. in the presence of catalysts containing palladium, platinum or mixtures thereof, catalysts applied to silicic acid being used which contain 0.5 to 5% by weight of palladium, platinum or mixtures thereof (with reference to silicic acid) and which have a content of alkali metal phosphates, alkaline earth metal phosphates, alkali metal borates, alkaline earth metal borates or mixtures thereof of 0.5 to 10% by weight with reference to the whole of the catalyst). Tetrachloro-o-phthalonitrile may be used for the production of phthalocyanines which in turn may be used as pigment dyes.

---

This invention relates to a process for the continuous production of tetrachloro-o-phthalonitrile.

It is known from U.S. Patent No. 3,108,130 that chlorinated o-phthalonitriles are obtained by reaction of o-phthalonitrile with chlorine in the presence of active carbon as catalyst which may have been activated with potassium chloride, calcium chloride, barium chloride, acid clay, kaolin or aluminum oxide gel.

It is an object of this invention to provide an improved process for the production of tetrachloro-o-phthalonitrile in which only few cracked products are obtained besides the tetrachloro-o-phthalonitrile. Another object of the invention is the provision of an improved process in which the catalyst used retains a high activity over a long period. It is a further object of the invention to provide an improved process according to which the catalysts can be easily reactivated by burning off.

In accordance with this invention these and other objects and advantages are achieved by an improved process for the continuous production of tetrachloro-o-phthalonitrile by reaction of o-phthalonitrile with chlorine in the gas phase at elevated temperature in the presence of catalysts containing palladium, platinum or mixtures thereof wherein the improvement consists in using catalysts comprising at least one metal selected from the group consisting of palladium and platinum applied to a silicic acid carrier and having a content of at least one compound selected from the group consisting of the phosphates and borates of alkali and alkaline earth metals.

The o-phthalonitrile and chlorine are in general reacted in a molar ratio of at least 1:4. It is preferred to use an excess of chlorine, for example up to a molar ratio of 1:7.2. The chlorine may if desired be diluted with inert gas, such as nitrogen, hydrogen chloride or carbon tetrachloride. It is advantageous to choose a volumetric ratio of chlorine to inert gas of 1:0.1 to 1:1, preferably of 1:0.3 to 1:0.7.

Temperatures of from 300° to 500° C., preferably from 400° to 450° C., are in general used. It is advantageous to carry out the reaction at atmospheric pressure. It is however also possible to carry out the reaction at slightly reduced pressure, for example at 300 mm., or at slightly increased pressure, for example up to 1.5 atmospheres gauge.

Catalysts containing palladium, platinum or mixtures thereof and which have been deposited on silicic acid as a carrier are used according to this invention. The catalysts advantageously contain 0.5 to 5%, preferably 1 to 3%, by weight of palladium, platinum or mixtures thereof with reference to the carrier material. The weight percentages relate to the metals regardless of the form in which they are present in the catalyst. The catalysts also contain at least one of the alkali metal phosphates or alkaline earth metal phosphates or alkali metal borates or alkaline earth metal borates. Examples of compounds which are suitable for the production of the catalysts are: $NaH_2PO_4$, $Na_2HPO_4$, $Na_3PO_4$, $K_2HPO_4$, $K_3PO_4$, $CaHPO_4$, $K_2H_2P_2O_7$, $KPO_3$, $Mg_2P_2O_7$, $Na_2B_4O_7$, $CaB_4O_7$. Alkali metal phosphates are particularly preferred. The catalysts advantageously have a content of 0.5 to 10%, preferably 1 to 5% by weight, of phosphates or borates with reference to the whole catalyst. The said data relate to $P_2O_5$ or $B_2O_3$ as determined analytically in the finished catalyst, regardless of the form in which the compounds are contained in the catalyst. The catalysts may be prepared for example by simultaneous or successive impregnation of silicic acid pellets with aqueous solutions of palladium salts, platinum salts or mixtures of said salts and with aqueous solutions of phosphates, borates or mixtures thereof. The catalyst is then dried and activated by heating, preferably to 300° to 400° C.

The process according to this invention may be carried out for example by passing o-phthalonitrile, chlorine and if desired inert gas in the specified ratio over a stationary catalyst of the specified composition arranged in a reaction tube at the temperatures specified.

The tetrachloro-o-phthalonitrile separates from the gas stream upon cooling. It is also possible to feed liquid o-phthalonitrile into the reaction tube and to vaporize it therein. In another embodiment, the gaseous mixture of chlorine, o-phthalonitrile and if desired inert gas is passed upwardly through a fluidized bed of a catalyst having the said composition.

The tetrachloro-o-phthalonitrile obtained according to this invention may be reacted with copper salts, iron salts or nickel salts to form green phthalocyanines which can be used as pigment dyes (cf. F. H. Moser, "Phthalocyanine compounds," Reinhold Publishing Co., New York, 1963, page 104).

The invention is illustrated by the following examples in which the parts specified are parts by weight unless stated otherwise. Parts by weight bear the same relation to parts by volume as the kilogram to the liter.

EXAMPLE 1

A vertical reaction tube having a capacity of 0.5 part by volume is filled with silicic acid pellets containing 2.5% by weight of palladium and 3% by weight of sodium phosphate and heated for two hours at 380° to 400° C.

$7.7 \times 10^{-3}$ parts of molten phthalonitrile per hour is then dripped onto the catalyst heated to 400° to 420° C. and at the same time 9 parts by volume of chlorine and 5 parts by volume of nitrogen per hour are passed through the tube. $15.2 \times 10^{-3}$ parts of a mixture of chlorinated phthalonitriles having a melting point of 243° to 248° C. separates per hour at the bottom of the reaction tube. The mixture contains 94.8% by weight of tetrachloro-o-phthalonitrile. The yield is 95.4% of the theory with reference to o-phthalonitrile used.

EXAMPLE 2

The reaction tube used in Example 1 is filled with silicic acid pellets containing 3% by weight of palladium and 3% by weight of secondary potassium phosphate and heated for two hours at 400° to 410° C. $7.7 \times 10^{-3}$ parts of molten phthalonitrile is then dripped per hour onto the catalyst heated to 400° to 430° C. and at the same time 10.0 parts by volume of chlorine and 5.0 parts by volume of nitrogen are passed through per hour. $14.9 \times 10^{-3}$ parts per hour of a mixture of chlorinated phthalonitriles having a melting point of 246° to 248° C. is obtained. The mixture contains 93.7% by weight of tetrachloro-o-phthalonitrile. The yield is 93.7% of the theory with reference to o-phthalonitrile used.

We claim:

1. A process for the continuous production of tetrachloro-o-phthalonitrile which comprises reacting o-phthalonitrile with chlorine in a molar ratio of at least 1:4 in the gas phase, at a temperature of from 300° C. to 500° C. and in the presence of a catalyst consisting essentially of at least one metal selected from the group consisting of palladium and platinum applied to a silicic acid carrier in an amount of 0.5 to 5% by weight, with reference to silicic acid, said catalyst also having a content of 0.5 to 10% by weight, with reference to the whole catalyst, of at least one compound selected from the group consisting of the phosphates and borates of alkali metals and alkaline earth metals.

2. A process as claimed in claim 1 wherein the chlorine reactant is diluted with an inert gas.

3. A process as claimed in claim 2 wherein the ratio by volume of chlorine:inert gas is about 1:0.1 to 1:1.

4. A process as claimed in claim 1 wherein said reaction is carried out at a temperature of about 400° C. to 450° C.

5. A process as claimed in claim 1 wherein said catalyst has a content of said metal selected from the group consisting of palladium and platinum of about 1 to 3% by weight, with reference to silicic acid.

6. A process as claimed in claim 1 wherein the catalyst has a content of said compound selected from the group consisting of the phosphates and borates of alkali metals and alkaline earth metals of about 1 to 5% by weight, with reference to the whole catalyst.

7. A process as claimed in claim 1 wherein said catalyst consists essentially of said palladium, platinum or mixtures thereof applied to the silicic acid carrier and 0.5 to 10% by weight, with reference to the whole catalyst, of an alkali metal phosphate.

8. A process as claimed in claim 7 wherein said catalyst consists essentially of palladium applied to the silicic acid carrier and the alkali metal phosphate is sodium phosphate.

9. A process as claimed in claim 7 wherein said catalyst consists essentially of palladium applied to the silicic acid carrier and the alkali metal phosphate is potassium phosphate.

References Cited

UNITED STATES PATENTS

| | | | |
|---|---|---|---|
| 3,108,130 | 10/1963 | Haga et al. | 260—465 |
| 3,290,353 | 12/1966 | Battershell et al. | 260—465 |

CHARLES B. PARKER, Primary Examiner

S. T. LAWRENCE III, Assistant Examiner

U.S. Cl. X.R.

252—432, 437; 260—314.5